Oct. 27, 1970  V. J. TIZIO ET AL  3,535,882
SCRAMJET AIRCRAFT
Filed Dec. 27, 1966  4 Sheets-Sheet 1
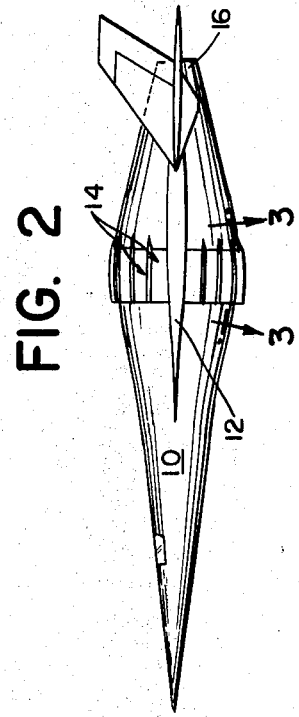
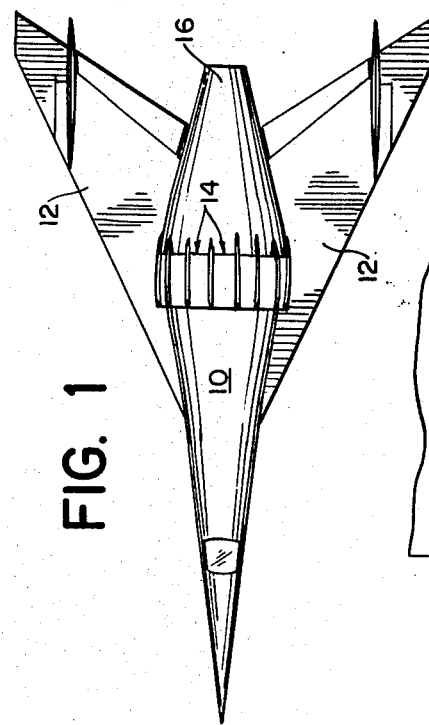
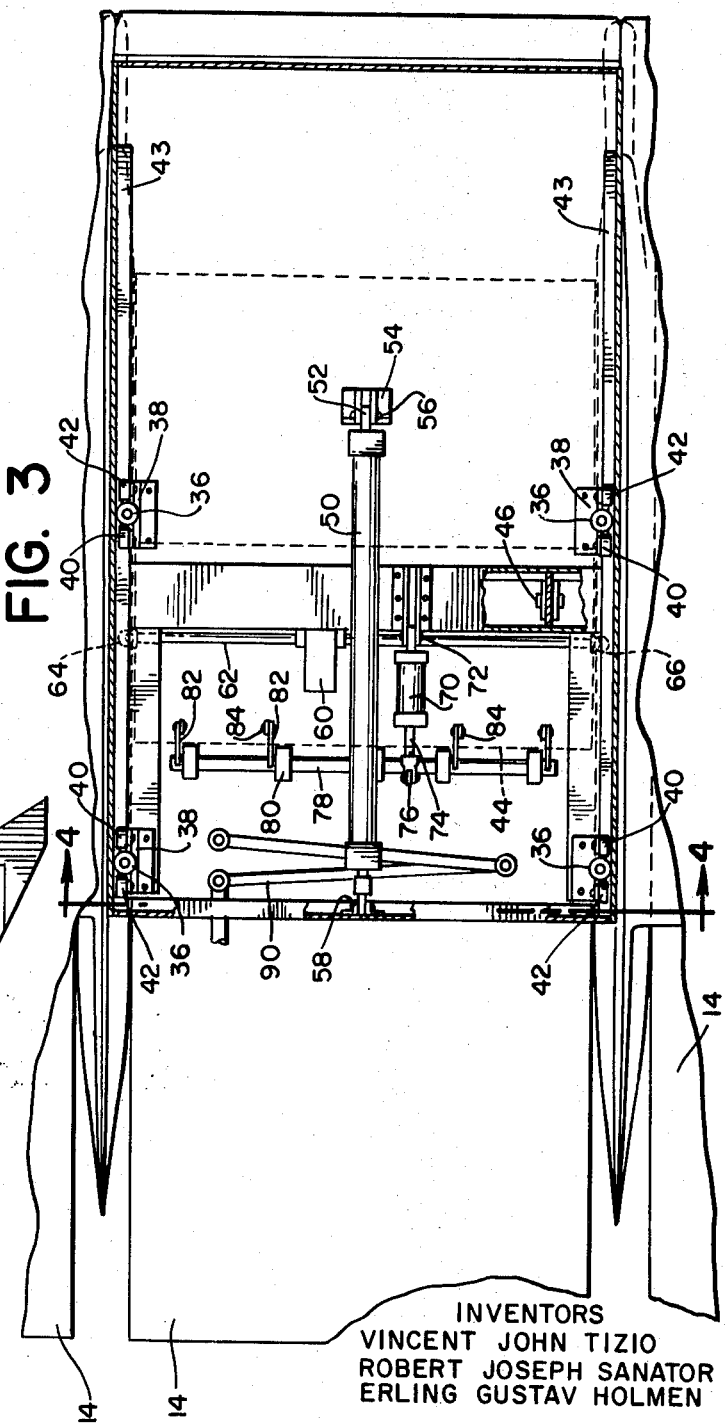
INVENTORS
VINCENT JOHN TIZIO
ROBERT JOSEPH SANATOR
ERLING GUSTAV HOLMEN
BY *Darby & Darby*
ATTORNEYS

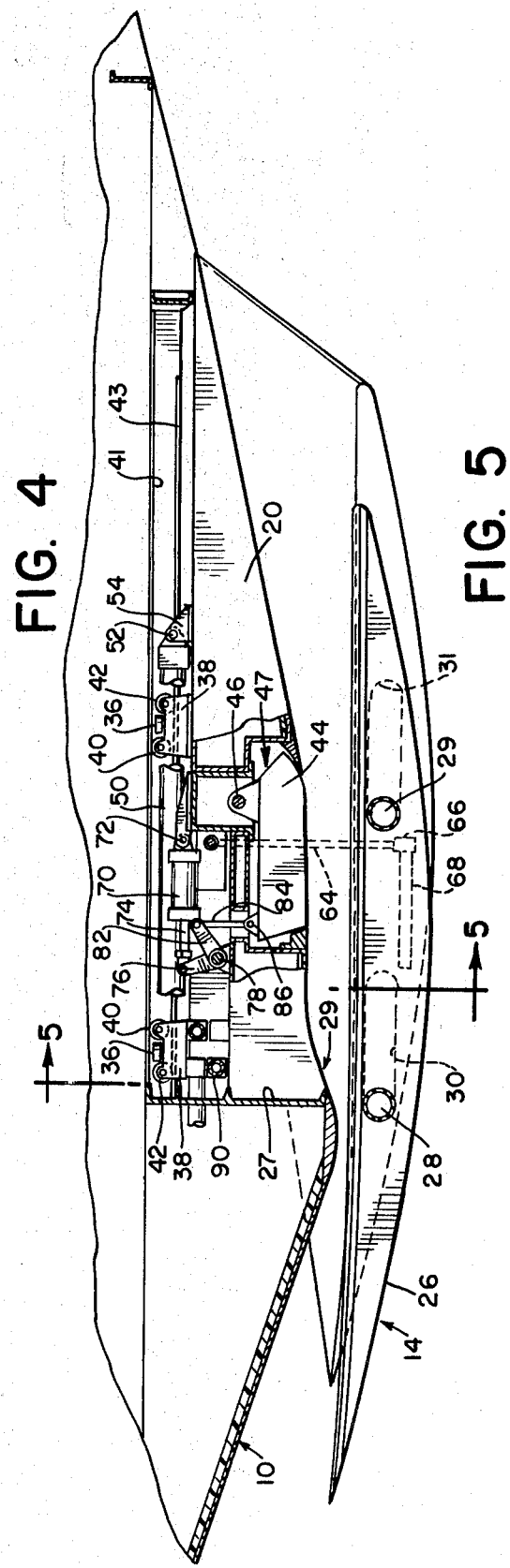
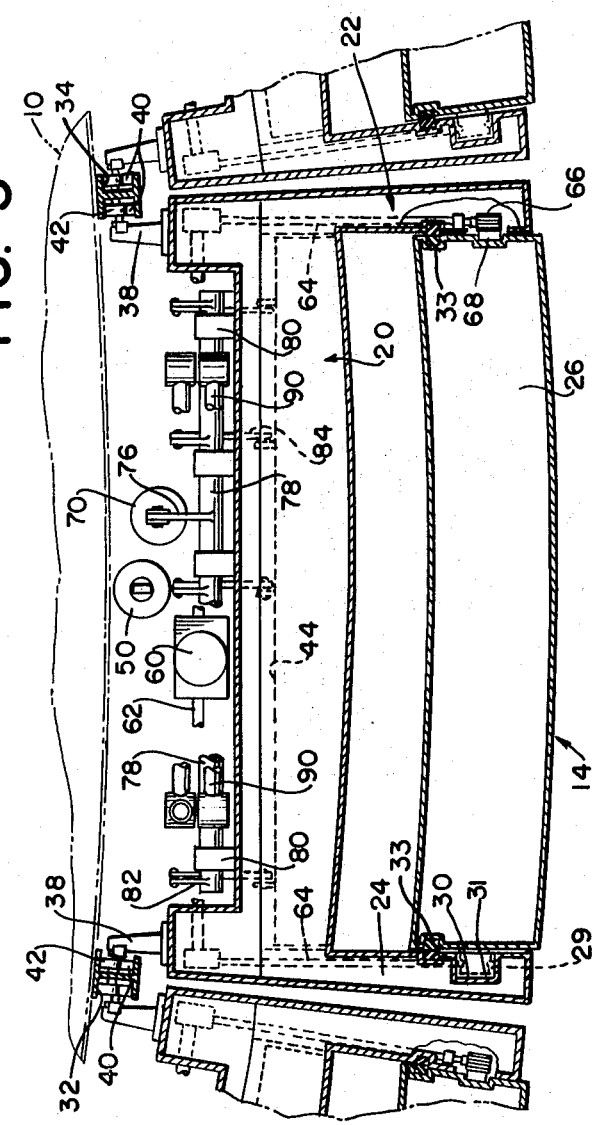

INVENTORS
VINCENT JOHN TIZIO et al

BY  *Darley + Darley*

ATTORNEYS

Oct. 27, 1970    V. J. TIZIO ET AL    3,535,882
SCRAMJET AIRCRAFT

Filed Dec. 27, 1966    4 Sheets-Sheet 4

INVENTORS
VINCENT JOHN TIZIO et al

BY *Darby & Darby*

ATTORNEYS

United States Patent Office 3,535,882
Patented Oct. 27, 1970

3,535,882
SCRAMJET AIRCRAFT
Vincent John Tizio, Syosset, Robert Joseph Sanator, New Hyde Park, and Erling Gustav Holmen, Huntington, N.Y., assignors to Fairchild Hiller Corporation, Farmingdale, N.Y., a corporation of Maryland
Filed Dec. 27, 1966, Ser. No. 607,130
Int. Cl. F02k 7/08, 7/10
U.S. Cl. 60—270                          3 Claims

ABSTRACT OF THE DISCLOSURE

A scramjet aircraft includes a plurality of scramjet engine modules arranged around the body of the aircraft. The modules each include a main body portion which is movable with respect to the aircraft body, and a cowl which is slidable within the main body section to vary the air inlet opening of the module.

---

The present invention pertains to supersonic aircraft and, in particular, to a modular supersonic combustion ramjet engine (scramjet) construction for use with such aircraft.

Scramjet propelled aircraft generally comprise a conically shaped forebody which serves to compress and heat ram air which is injected into an annular passage between the vehicle body and an outer cowl located around the vehicle centerbody. Fuel is mixed with the ram air, burned under the cowl and the resulting gases are expanded over the tapered vehicle afterbody to produce thrust. Scramjet engines do not function efficiently at speeds less than approximately Mach 3 to Mach 6 and, therefore, scramjet propelled aircraft are also provided with other means of propulsion. For example, turbojet engines may be used to accelerate the aircraft to Mach 3, at which point the turbojets would be shut down and the ramjet engines would take over to accelerate from Mach 3 to Mach 6.5 in a subsonic combustion mode, and from Mach 6.5 to Mach 12 and beyond in a supersonic combustion mode.

After cruising velocity (e.g., Mach 12) is attained, it is necessary to reduce the thrust level. For optimum aircraft performance, maximum engine area should be available for acceleration. This being so, cruise thrust cannot be achieved efficiently simply by reducing engine throttle setting (i.e., reduce fuel flow by one-half to two-thirds) because of engine cooling requirements. The purpose of the present retractable modular concept is to close off part of the exposed engine area during cruise thereby achieving efficient cruise thrust requirement. In addition, this arrangement provides a means for starting the scramjet inlet and also obviates the necessity for engine cooling during descent by retraction of all of the scramjet engine area.

Accordingly, the main object of the present invention is to provide a scramjet propelled vehicle wherein the amount of thrust can conveniently be controlled, and wherein the amount of fuel required to cool the engine when it is not operating at maximum thrust is substantially reduced.

Another object of the invention is to provide a scramjet propelled vehicle which presents reduced drag during cruising and decelerating phases, i.e. when operating at less than maximum thrust levels.

Another object of the invention is to provide a scramjet propelled vehicle providing substantial fuel savings.

Yet another object of the invention is to provide a simplified and readily repairable construction for scramjet propelled vehicles.

Briefly, in accordance with the invention, scramjet propulsion is provided by a plurality of scramjet modules arrayed circumferentially around a substantial portion of a vehicle. Each of the modules is physically removable for repair or replacement. During flight a typical scramjet engine module in the open position can be closed off simply by retracting the module. In the fully retracted position, the module is shaped such that it is flush with the vehicle forebody to substantially reduce the drag offered by the module. Moreover, in this retracted position, the use of fuel is not required to cool the burner surfaces of the engine module to the extent it would be if the module were in an extended position. Accordingly, for the latter reasons, a substantial fuel savings is realized.

In the drawings:

FIG. 1 is a top plan view of a representative dual mode scramjet propelled vehicle showing the arrangement of the engine modules;

FIG. 2 is a side view of the vehicle of FIG. 1;

FIG. 3 is a sectional view along the line 3—3 of FIG. 2;

FIG. 4 is a sectional view along the line 4—4 of FIG. 3;

FIG. 5 is a front sectional view along the line 5—5 of FIG. 4;

Figure 6:
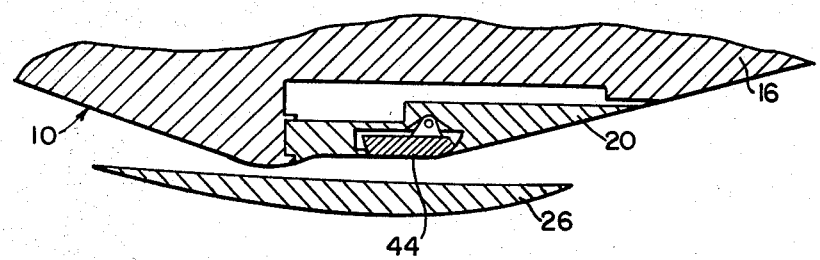
Figure 7:
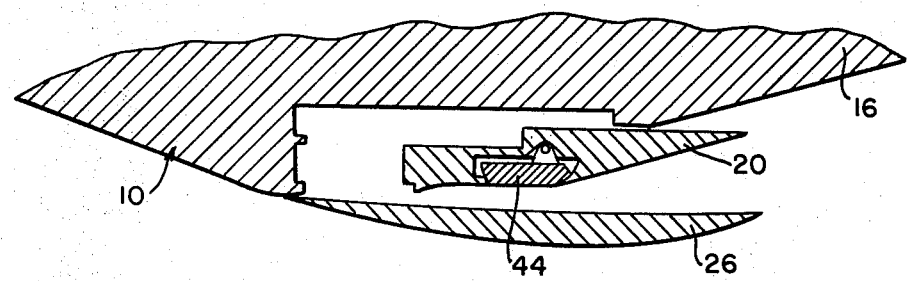
Figure 8:
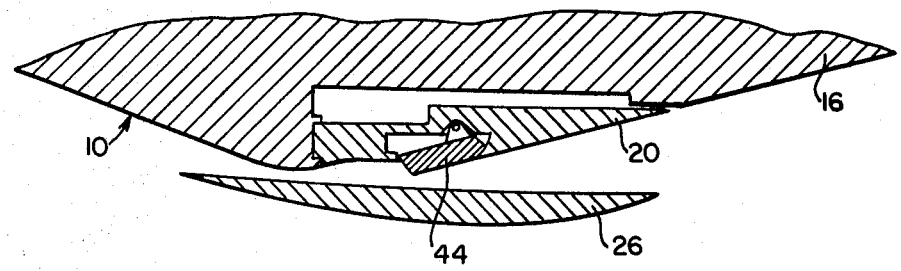
Figure 9:
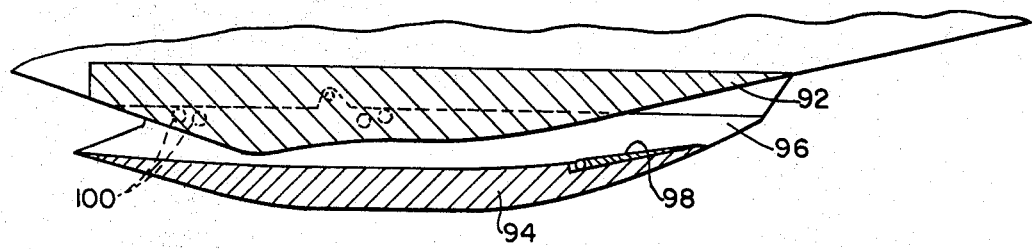
Figure 10:
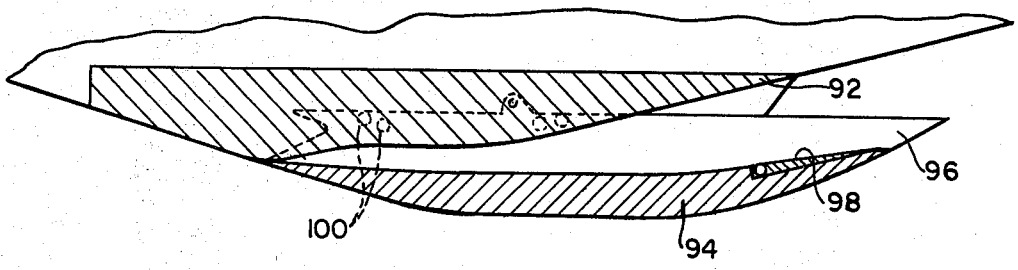
Figure 11:
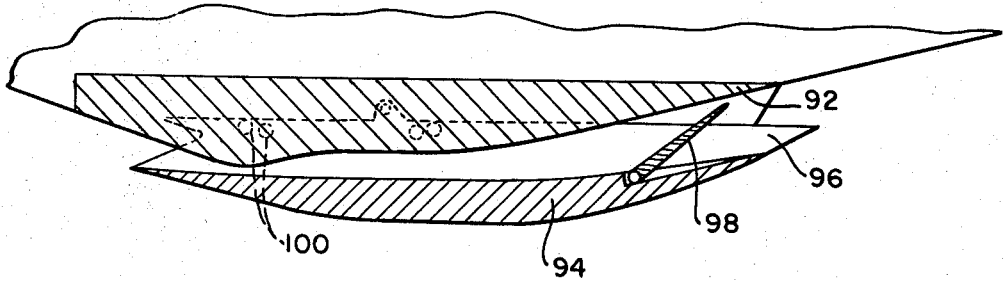

FIGS. 6, 7 and 8 are diagrammatic illustrations of the movement of an engine module in accordance with the invention; and FIGS. 9, 10 and 11 are diagrammatic illustrations similar to FIGS. 6, 7 and 8 showing another embodiment of the invention.

In FIGS. 1 and 2, a vehicle is illustrated employing the invention. The vehicle has a cone-shaped forebody 10, swept back wings 12, and a plurality of scramjet engine modules 14 arranged circumferentially around the entire base of the conically shaped forebody 10 (i.e. the vehicle centerbody). The afterbody of the vehicle terminates in a truncated cone 16 extending rearwardly from the engine modules 14. The arrangement of the engine modules shown in FIGS. 1 and 2 enables use of substantially all of the air rushing past the conical forebody 10 during flight. The engine modules themselves incorporate further advantages which are described with reference to FIGS. 3, 4 and 5, which illustrate the structure of a single module, all of the modules having the identical construction.

Each of the scramjet engine modules 14 comprises a main body 20 having integrally formed right and left side pylons 22 and 24, respectively. A sliding cowl 26 slides on two pairs of circulating ball rollers 28 and 29 in two roller tracks 30 and 31 within respective side pylons 22 and 24.

During scramjet operating conditions, the forward end of the main body 20 is engaged in a tapered slot 27 provided on the aircraft structure, and locked in place. A continuous upper combustor surface 29 is thereby provided which fairs with the vehicle forebody 10 and afterbody 16.

The tracks 30 can be shaped to provide a variation in inlet thrust and combustor height during the cowl's sliding motion. The joints between the cowl and the side pylons 22 and 24 will be sealed with sliding seals 33 which may utilize boron nitride sliding surfaces kept in contact by backing up with a resilient refractory felt (tungsten, etc.).

All combustor surfaces may be lined with a suitable heat exchanger (not shown) using the fuel (e.g. liquid hydrogen) in a regenerative cooled system. Approximately one-half inch of insulation (not shown) may be provided between the heat exchanger and the structural members.

The module itself is slidably mounted in a pair of I-beam tracks 32 and 34 extending outwardly from the vehicle body 10 (FIG. 5). Four roller fittings comprising two pairs of upstanding posts 36 and 38 each having two rollers 40 and 42 suitably journalled therein, slide in the opposing runways formed in the I-beam tracks 32 and 34 (FIG. 3). As shown in FIG. 4, rollers 40 and 42 contact the upper and lower surfaces 41 and 43, respectively of tracks 32 and 34. Each track 32 and 34 serves two adjacent modules.

Each of the engine modules may further include a variable nozzle door 44 (FIG. 4) for a subsonic combustion mode, which is pivotally mounted on an axle 46 extending the full width of the module and mounted within a recess 47 in the nozzle. The nozzle door 44 serves to control the thrust developed by the module and, as such, is known in the prior art. In conventional fashion, the ends of the nozzle door 44 will be sealed against the interior surfaces of the side pylons 24 and 22.

The vehicle forebody and forward part of the cowl 26 acts as the air induction system, while the vehicle afterbody 16 and aft cowl section act as a plug-type nozzle exhaust system. The system uses a common combustor for both subsonic and supersonic combustion modes and a retractable subsonic nozzle throat provided by the variable nozzle door 44 at the aft end of the combustor. At the pressures and temperatures involved, auto-ignition will take place when the fuel (hydrogen) contacts the compressed air in the combustion chamber.

The invention is not limited to specific means for providing the relative movement between the parts as so far described. The following is given only as a representative example of suitable structure for this purpose.

The module is moved by an hydraulic actuator which comprises an elongated cylinder 50 (FIG. 3) adapted to control by fluid pressure the position of a rod 52 which is pinned at 56 to a suitable mounting plate 54 connected to the top of main body 20 of the engine module. Cylinder 50 is connected at 58 to the forebody 10 so that when fluid is introduced into the cylinder at the front end (the left of FIGS. 3 and 4) the rod 52 is pushed toward the rear causing the entire engine module to move from left to right, i.e. toward its retracted position. Hydraulic actuators for such purposes are well known in the aircraft arts.

Relative movement of the sliding cowl 26 with respect to the main body 20 of the module is provided by a cowl actuator 60 located above the main body 20 and adapted to rotate a driveshaft 62 which extends the width of the module. The driveshaft 62 is geared to a pair of vertical rods 64, which terminate in pinions 66 (FIG. 5) in engagement with racks 68 secured to the respective sides of the cowl 26. Hence, when actuator 60 causes the pinions 66 to rotate through shafts 64 and 62, cowl 26 slides in the roller tracks 30 and 31 forwardly from the position illustrated in FIGS. 4 and 5. Cowl 26 should be in its aft position during movement of the entire module.

The nozzle door 44 is actuated by an hydraulic cylinder 70 attached at 72 to the upper portion of main body 20 immediately above the axle 46. An actuator rod 74 extends from cylinder 70 and is pinned to a crank 76 which is adapted to rotate an elongated shaft 78 through a limited arc. Shaft 78 is supported in collars 80 which may be fixed to the main body 20 in any desired fashion. Five levers 82 spaced along shaft 78 and immovably secured thereto are pivotally connected to respective push rods 84 which, in turn, are pinned at 86 to the top of the nozzle door 44. Hence, when fluid is applied to cylinder 70 causing the rod 74 to move into cylinder 70, the shaft 78 rotates in a clockwise direction (FIG. 4) moving the push rods 84 downwardly and opening the nozzle door 44.

The present invention does not pertain to the specific means for conducting fuel to the combustion areas but, since there is relatively movement between the module and the forebody itself, a swivel joint fuel line 90 may be provided to supply fuel from the aircraft to the main body 10 of the module. Fuel may be similarly applied to the side pylons 22 and 24 and variable nozzle door 44.

A suitable stop and locking mechanism (not shown) may be used to limit the aftward motion of the module. Such stops may be removed when it is desired to replace or repair the module, so that with relatively little difficulty the entire module can be withdrawn from the aircraft and replaced by another identical module, or repaired and then returned to its position.

FIGS. 6, 7 and 8 are diagrammatic illustrations showing three relative positions of the vehicle (10 and 16) and module main body 20 and cowl 26. For a typical dual mode ramjet engine, i.e., subsonic combustion and supersonic combustion in a common burner, the construction is as shown in FIGS. 6 and 7 for the engine in the scramjet and in the closed position, respectively. FIG. 8 depicts the engine construction in the intermediate subsonic combustion mode. In FIG. 6, the engine module is shown fully extended with the cowl 26 also fully extended with respect to the main body 20 of the module. The nozzle door 44 is closed and this position corresponds to the detailed illustration in FIGS. 3, 4, and 5. The module configuration of FIG. 6 is that used to start the engines.

In FIG. 8, the cowl 26 has been retracted to its aft position, but the main body 20 remains fully extended. The nozzle door 44 is shown open. This configuration may be used during an acceleration phase.

FIG. 7 shows the module in is fully retracted position, which it assumes when the scramjet engine is shut down. In FIG. 7, the manner in which the cowl 26 is flush with the forebody 10 is clearly shown, and it is evident that in this position the engine offers substantially reduced drag and at the same time is incapable of receiving air, and thereby requiring fuel for cooling purposes. Although only three positions of the module and cowl are shown in FIGS. 6, 7, and 8, during the cruise phase (for example) the cowl 26 and nozzle door 44 may be moved to positions intermediate to those illustrated in FIG. 6 and FIG. 8 to control thrust by varying the intake of air.

A second embodiment of the invention is diagrammatically illustrated in FIGS. 9, 10, and 11. This embodiment also comprises a plurality of separate modules consisting of two parts. In this case, the upper body 92 of the module is removably connected to the body of the aircraft by conventional engine mount fittings (not shown) which provide for thermal expansion as well as transfer of loads. The movable portion of the module is the outer cowl 94 which includes a pair of side pylons 96 integrally formed therewith (only one shown), to form a suitable air scoop. The trailing edge of cowl 94 is provided with a plurality of hinged flaps 98 (only one illustrated) which move in a radial motion to form the subsonic combustor nozzle throat. Four roller fittings 100 are mounted on the upper end of the side pylons 96, similar to the construction described with reference to FIGS. 3, 4, and 5. Suitable actuator means (not shown) provides relative motion between the cowl 94 and upper body 92. All surfaces of the combustor may be lined with a heat exchanger using the fuel in a regenerative cooled system. Approximately one-half inch of insulation is provided between the heat exchanger and the structural members. Fuel plumbing between the various components may be accomplished in any suitable fashion.

The operation of this embodiment is substantially the same as the embodiment of FIGS. 6, 7, and 8. In the position shown in FIG. 11, the engine is configured for subsonic combustion. In FIG. 10, the module is completely retracted during its shutdown phase. The flap 98 and cowl 94 may be moved to intermediate positions other than those illustrated.

The specific design of the engine modules will be in accordance with known theory conventional techniques and, as such, is not material to the present invention. The major design parameters will include the vehicle inlet forebody included angle, the inlet compression ratio, the combustion cycles, and the nozzle boat-tail angle. Other parameters such as vehicle volumetric fraction, inlet efficiency, viscous flow effects, and cooling requirements are strongly dependent upon the aforementioned major parameters. Numerous modifications and embodiments of the invention will be obvious to those skilled in the art and, accordingly, the invention should not be limited except as defined in the following claims.

What is claimed is:

1. Vehicle propulsion apparatus for use with a vehicle having a conically shaped forward portion, comprising a plurality of scramjet engine modules circumferentially arranged around a substantial portion of said vehicle body, means for moving each of said modules fore and aft of said body, each of said modules including a main body portion, cowl, and positioning means for positioning said cowl fore and aft with respect to its associated main body portion, said module and cowl being movable relative to said vehicle body by said moving means and positioning means between an extended position in which a substantial air inlet to the module is provided and a retracted position in which the air inlet is substantially closed with the external surface of the cowl being substantially flush with the forward portion of the vehicle.

2. Vehicle propulsion apparatus according to claim 1, wherein each of said main body portions contains side pylons having tracks, the cowl associated therewith being movable along said tracks.

3. Vehicle propulsion apparatus according to claim 2, wherein each of said modules further includes a variable nozzle door secured to the module between said main body portion and cowl for constricting the gas flow passage therebetween.

References Cited

UNITED STATES PATENTS

| | | | |
|---|---|---|---|
| 2,610,465 | 9/1952 | Imbert et al. | 60—270 |
| 2,916,230 | 12/1959 | Nial | 244—15 |
| 3,027,118 | 3/1962 | Willox | 60—270 |
| 3,280,565 | 10/1966 | Dugger et al. | 60—270 |
| 3,324,660 | 6/1967 | Lane et al. | 60—262 |

SAMUEL FEINBERG, Primary Examiner

U.S. Cl. X.R.

60—224, 271; 137—15.1; 244—73